Dec. 28, 1965   L. D. DUNN ET AL   3,225,801
GUIDE MEANS FOR BAND SAW BLADE
Filed March 17, 1964
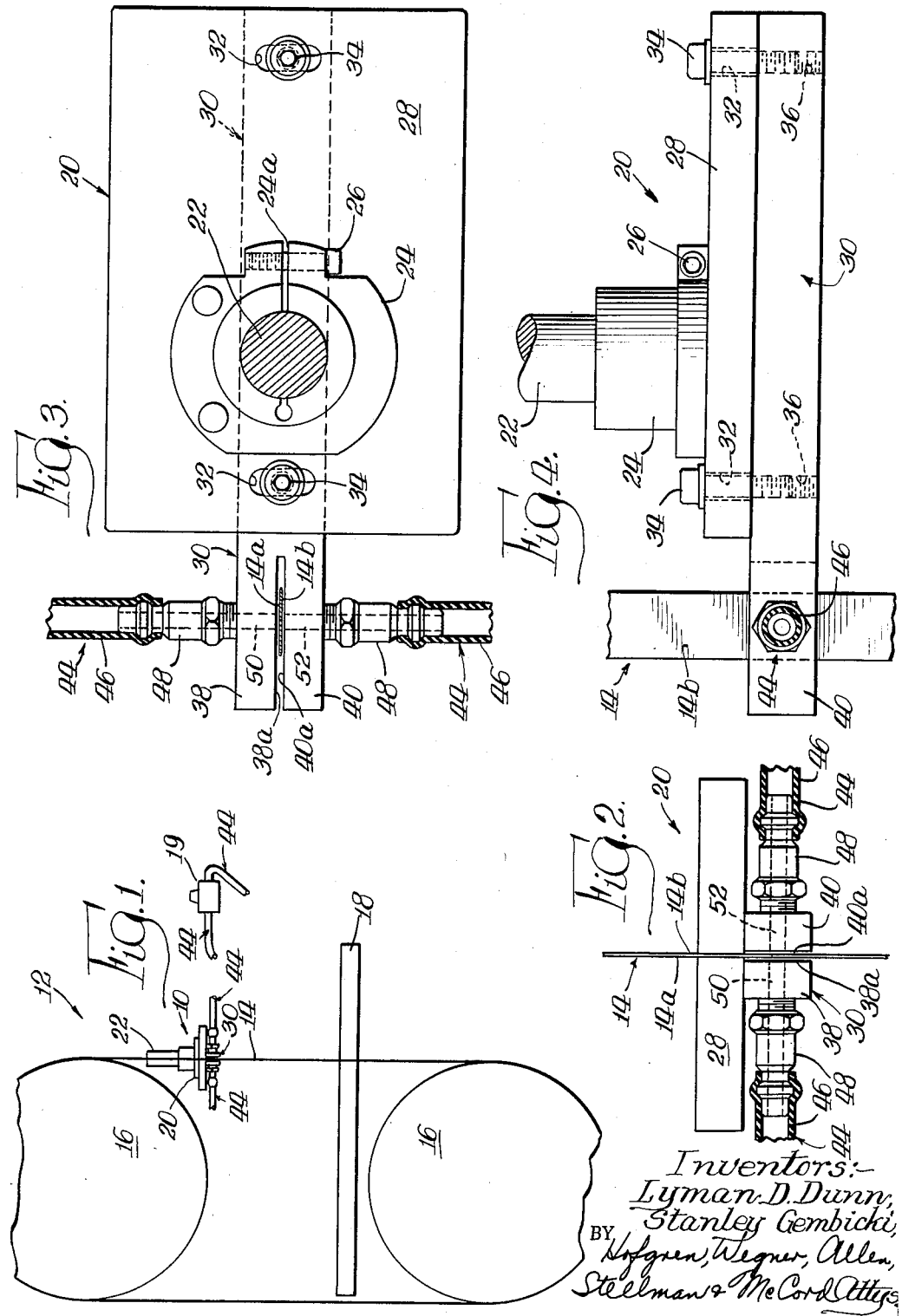
Inventors:—
Lyman D. Dunn,
Stanley Gembicki,
BY Hofgren, Wegner, Allen,
Stellman & McCord Attys.

3,225,801
GUIDE MEANS FOR BAND SAW BLADE
Lyman D. Dunn, Chicago, and Stanley Gembicki, Des Plaines, Ill., assignors to Marlan Company, a corporation of Illinois
Filed Mar. 17, 1964, Ser. No. 352,446
8 Claims. (Cl. 143—160)

This invention relates to power saws and more particularly to a new and improved guide means for a band saw blade.

Power saws of the band saw type require a means for guiding a blade in its path of travel so that the blade will cut in a straight line. Present guide means utilize a restricted passage, the sides of which engage the faces of the band saw blade to properly align the blade for optimum cutting. This creates a load on the band saw itself as well as wearing down the face of the blade and guide. In time, the blades may become worn to a point where they are of such a reduced thickness that they break and the guides may become so worn that they fail to properly align the blade. With the advent of extremely thin band saw blades in the order of less than .012" in thickness, such a frictional guiding means of the blade is not suitable due to the rapidity with which the blades would be worn thin enough to break. Thus, it becomes desirable to provide a guide means for a band saw blade which does not create a load on the power source of the blades and does not cause substantial wear on the faces of the blade.

A general object of this invention is to provide a new and improved guide means for a band saw blade.

It is a primary object of this invention to provide a new and improved guide means for a band saw blade which maintains the blade in a true linear path properly aligned for optimum cutting without bodily contacting the blade.

It is another object of this invention to provide a new and improved guide means for a band saw blade which does not impart a load to the drive means for the band saw blade.

It is yet another object of this invention to provide a new and improved guide means for a band saw blade which imparts a guiding force to the blade from a point spaced from the blade, and free of bodily contact with the blade faces.

Yet another object of this invention is to provide a new and improved guide means for a band saw blade which utilizes air under pressure to properly align the blade for optimum cutting.

Other objects, features and advantages of the present invention will be apparent from the following description of the preferred embodiment illustrated in the accompanying drawings, in which:

FIGURE 1 is a fragmentary diagrammatic view of a band saw utilizing the blade guide means of this invention;

FIGURE 2 is a fragmentary enlarged view of a portion of the blade guide means of this invention;

FIGURE 3 is a fragmentary enlarged section view showing the blade guide means of this invention substantially in top plan view; and FIGURE 4 is a side elevational view of the blade guide means shown in FIGURE 3.

Referring now to the drawings, in FIGURE 1 the air guide means 10 of this invention is shown in use with a band saw having a continuous flexible band saw blade driven by wheels 16 in a well known fashion. The band saw blade 14 passes through the guide means 10 so that it might be properly aligned for optimum cutting performance as it passes through the work table 18. Air guide adjusting means 19 is provided for suitably adjusting and maintaining proper blade alignment in a manner to be explained later.

Referring now with more particularly to FIGURES 2, 3 and 4, the air guide means 10 includes a support 20 held on an upright post 22 of the band saw by the collar means 24. Collar means 24 is slotted at one end 24a and provided with a transversely extending bolt 26 through the slot for securing the collar to the post 22.

The support further includes a base plate 28 to which is secured the channel bar 30. Base plate 28 is provided with a pair of wide slotted openings 32 at either end through which bolts 34 pass and are threaded into taps 36 in the channel bar to secure the bar to the base plate and to permit limited lateral adjustment of the bar relative to the plate.

The channel bar 30 is forked at the free end to form two legs 38 and 40 through which the band saw blade 14 passes in its path of travel to the work table between the opposed spaced surfaces 38a and 40a of each of the legs, respectively. Fluid supply conduits 44 are secured to either fork 38 and 40 for supplying fluid under pressure thereto from a suitable source (not shown). The conduits consist of a flexible hose 46 held to a well known metal fitting 48 which is threaded into each of the forked ends in alignment with fluid supply passages 50 and 52 in the ends 38 and 40, respectively.

In operation, as the band saw blade is continuously driven through its path of travel by the power wheels the blade passes between the opposed surfaces 38a and 40a of the forked end of the channel bar. The conduit 44 supplies fluid under pressure to the fluid supply passages 50 and 52, respectively. The opposite blade faces 14a and 14b, respectively, are then exposed to fluid under pressure directed thereagainst from the fluid supply passages.

Preferably, the fluid under pressure is air. With extremely thin blades, such as .012" in thickness or less, air pressure is sufficient when directed against the face of the blade, to influence blade alignment. The pressure of the air may be appropriately regulated and balanced by the regulating means 19 in a well known manner so as to substantially equalize the pressure directed against the opposite faces of the blade and maintain the blade linearly aligned and spaced from either face 38a or 40a for optimum cutting performance. Thus the blade may pass through the work table free of bodily contact with any mechanical guide device which might tend to create wear on the faces of the blade. The air directed against the faces of the blade may act as a lubricant as well as a cushion preventing the blade from frictionally engaging the opposed surfaces 38a and 40a. Since the force exerted against the faces of the blade by the air is proportional to the distance between the blade and the inner faces of the channel, the blade can be easily held in a plane substantially equidistant from each face 38a and 40a and maintained in straight linear alignment for optimum cutting performance by proper regulation of the pressure by means of the regulating means 19.

It is to be understood that other gases or liquid could be used as the suitable fluid under pressure to guide the saw blade. For example, carbon dioxide or nitrate gas could be used and even propellant gases, such as Freon could be used in certain special applications. It is also to be understood that this guide means is not necessarily limited to band saws but could find applications in other saws, such as reciprocating saws or the like. More than one guide means may be used in each saw if conditions warrant such a multiplicity of guiding means due to the length of travel of the band saw blade, the work load or a combination of both.

It has been found that the application of pressure to the opposite sides of the blade and the guide means of this invention produce vibrations of a high frequency in the blade and improves the cutting action of the blade. This improved cutting action is twofold; the blade actually cuts at a faster rate and there appears to be less friction between the blade and the product being cut.

The guide means of this invention is especially useful in guiding ultrathin band saw blades having a thickness of less than .012″. With such blades it can be readily appreciated that a frictional type guide means which bears against the face of such blades would quickly reduce the cross sectional thickness of the blades to such a degree that the blades would soon break under the tension required to maintain the band saw blades in linear alignment. While being especially suited for use with such ultrathin blades, it should be understood that the guide means of this invention is extremely useful for guiding blades of normal thickness.

We claim:

1. Guiding means for a power saw having an endless band saw blade continually running through a working station for cutting a work piece held at the station, comprising: a support adjacent the path of travel of the blade, fluid conducting elements on either side of the path of travel of said blade secured to said support; means directing fluid under pressure to said elements and against the opposite faces of said blade; and means regulating the pressure of the fluid to create a balance on either side of the blade for maintaining the blade in proper alignment.

2. Guide means for a power saw having an endless band saw blade continually running through a working station to cut a work piece held at the station, comprising: support means adjacent the path of band saw travel; spaced fluid conducting means secured to said support and defining a channel through which said band saw blade is continually driven; said fluid conducting elements having opposed surfaces through which fluid under pressure is directed into said channel against the opposed faces of said band saw blade; and means regulating the pressure of said fluid to create a balance on either side of said band saw blade for maintaining the blade in proper cutting alignment.

3. The guide means of claim 2 wherein said fluid is air.

4. The guide means of claim 2 further provided with means for adjusting the direction of fluid conduction against the faces of said band saw blade.

5. The method of guiding a band saw blade to a working station of a power saw, comprising: introducing air under pressure against either face of the band saw blade, and regulating the air pressure to maintain the blade in optimum cutting alignment.

6. The method of guiding a band saw blade through a working station of a power saw, comprising: providing a restricted channel through which the blade must pass and introducing air under pressure from either side of said channel against the opposite faces of the blade to maintain the blade in cutting alignment.

7. The method of guiding a band saw blade through a working station of a power saw, comprising: providing a restricted channel through which the blade must pass; introducing air under pressure from either side of the channel against opposite faces of the blade; and regulating the air pressure to create a balance on either side of the blade to maintain the blade in optimum cutting alignment.

8. A guide for a band saw blade, comprising: a member having a bifurcation defining a blade passage and means for creating a blade guiding fluid pressure in said passage, said pressure impinging on both sides of said blade in substantially equal force whereby said blade is maintained in a proper path during use without frictional wear.

No references cited.

WILLIAM W. DYER, JR., *Primary Examiner.*